US012227014B2

(12) United States Patent
Puehler et al.

(10) Patent No.: US 12,227,014 B2
(45) Date of Patent: Feb. 18, 2025

(54) AUTOMATIC DESKTOP PERSONALIZATION DEVICE FOR BOOKLET DOCUMENTS

(71) Applicant: SURYS GMBH, Dieburg (DE)

(72) Inventors: Peter Puehler, Roedermark (DE); Markus Schaefer, Dieburg (DE)

(73) Assignee: SURYS GMBH, Dieburg (DE)

(*) Notice: Subject to any disclaimer, the term of this patent is extended or adjusted under 35 U.S.C. 154(b) by 224 days.

(21) Appl. No.: 18/003,848

(22) PCT Filed: Jul. 23, 2021

(86) PCT No.: PCT/EP2021/070688
§ 371 (c)(1),
(2) Date: Dec. 29, 2022

(87) PCT Pub. No.: WO2022/023209
PCT Pub. Date: Feb. 3, 2022

(65) Prior Publication Data
US 2023/0249472 A1 Aug. 10, 2023

(30) Foreign Application Priority Data
Jul. 27, 2020 (EP) ..................................... 20187956

(51) Int. Cl.
H04N 1/04 (2006.01)
B41J 2/44 (2006.01)
(Continued)

(52) U.S. Cl.
CPC ................ B41J 2/442 (2013.01); B41M 3/14 (2013.01); H04N 1/0057 (2013.01); H04N 2201/0096 (2013.01)

(58) Field of Classification Search
USPC ............................................... 358/1.14, 1.4
See application file for complete search history.

(56) References Cited

U.S. PATENT DOCUMENTS 7,931,270 B2    4/2011  Kirschbauer et al.
2001/0045455 A1* 11/2001 Kreuter ..................... B41J 3/283
                                                235/381

FOREIGN PATENT DOCUMENTS

EP    1520715 A1    4/2005
WO    01/54918 A1   8/2001

OTHER PUBLICATIONS

International Search Report for International Application No. PCT/EP2021/070688, mailed Sep. 29, 2021, 4 pages.
(Continued)

Primary Examiner — Cheukfan Lee
(74) Attorney, Agent, or Firm — TraskBritt

(57) ABSTRACT

An automatic desktop personalization device, for security booklet documents, includes a camera, an inkjet printing module, a laser marking module, a chip encoding module, and a transport mechanism. The inkjet printing module includes a printing head and is configured to print within a printing zone. The laser marking module is configured to mark within a marking zone. The transport mechanism is configured to automatically transport a security booklet document along a Y-axis linear direction, from an entrance to an exit, through printing positions and a marking position. The entrance and the exit are the same. The printing head is movable alongside an X-axis linear direction that is perpendicular to the Y-axis linear direction. The inkjet printing module includes the transport mechanism. The laser marking head is adjacent an inkjet printing bridge, such that the marking zone and the printing zone are at least partly combined.

18 Claims, 4 Drawing Sheets

(51) Int. Cl.
 *B41M 3/14* (2006.01)
 *H04N 1/00* (2006.01)

(56) References Cited

OTHER PUBLICATIONS

International Written Opinion for International Application No. PCT/EP2021/070688, mailed Sep. 29, 2021, 7 pages.
European Communication pursuant to Article 94(3) EPC for European Application No. 20187956.6, dated Nov. 2, 2022, 3 pages.
European Search Report and Search Opinion Received for EP Application No. 20187956.6, dated on Jan. 21, 2021, 8 pages.

* cited by examiner

AUTOMATIC DESKTOP PERSONALIZATION DEVICE FOR BOOKLET DOCUMENTS

CROSS-REFERENCE TO RELATED APPLICATIONS

This application is a national phase entry under 35 U.S.C. § 371 of International Patent Application PCT/EP2021/070688, filed Jul. 23, 2021, designating the United States of America and published as International Patent Publication WO 2022/023209 A1 on Feb. 3, 2022, which claims the benefit under Article 8 of the Patent Cooperation Treaty to European Patent Application Serial No. 20187956.6, filed Jul. 27, 2020.

TECHNICAL FIELD

The present disclosure relates to desktop stand-alone personalization devices, for personalization of documents/booklets, where, in particular, documents/booklets are identity documents, e.g., passports.

BACKGROUND

Personalization devices comprise printers.

Two categories of printers exist. A first category relates to manual feeding printers. Such printers have a good print quality but are not suitable with industrial needs because of the time that is required to insert the booklet in the printer and to take it out.

Such printers are known, for instance, from document EP1520715, which discloses a passport that is moved in a shuttle along a Y direction under a printing device that is standing still at least along the Y direction. Accordingly, a passport needs to pass twice under the printing device before being fed out of the printer. In addition, the position of the shuttle must be known and controlled very precisely to get a good printing quality.

A second category of printers relates to automatic feeding printers. Such printers are more suitable for industrial needs and are known, for instance, from documents such as U.S. Pat. No. 7,931,270, in which a large number of security documents or smart cards are arranged in an input station and are picked up in a direction by means of a shuttle system, which can be displaced back and forth parallel to the longitudinal axis. The shuttle is designed in such a way that it can feed to or remove documents from output areas of processing stations by means of a pivoting movement or by means of a pusher. As for manual printers, such printers face the issue by which the position of the shuttle must be known and controlled very precisely.

Thus, specific printers for printing on passport exist but are complex, especially their printing head assembly, heavy (not desktop), and therefore very costly.

In this context, it is therefore an aim of embodiments of the present disclosure to provide a simple desktop personalization devices for security booklets, e.g., passports, that is capable of print, laser mark, or both print and laser mark, predetermined pages of the security booklets. Accordingly, embodiments of the present disclosure can be implemented for security booklets such as paper documents/booklets, which comprise only paper pages, the quality of which allows to print and laser mark on a same page; and hybrid documents/booklets, which comprise both paper and polycarbonate pages.

BRIEF SUMMARY

According to a first of its objects, the present disclosure relates to an automatic desktop personalization device, for personalization of security booklet documents comprising a spine, the personalization device comprising:
a casing,
a camera,
an inkjet printing module, comprising a moveable printing head mounted on a fixed printing bridge, and configured to print within a printing zone,
a laser marking module, comprising a laser marking head, configured to mark within a marking zone,
a chip encoding module, and
a security booklet document transport mechanism, configured to automatically transport a security booklet document along a Y-axis linear direction, from an entrance to an exit of the automatic desktop personalization device, through printing positions and a marking position, which is different from the printing positions, wherein the entrance and the exit are the same,
wherein the printing head is movable alongside an X-axis linear direction, which is perpendicular to the Y-axis linear direction.

It is essentially characterized in that:
the inkjet printing module comprises the security booklet document transport mechanism;
the laser head is adjacent to the inkjet printing bridge, such that the marking zone and the printing zone are at least partly combined; and
the laser marking module (10) is located above, piled up with, the inkjet printing module (20); such that the laser marking zone is located within the inkjet printing module and at least partly overlaps, is coincident with, the inkjet printing zone.

In one embodiment, the chip encoding module is integral with the security booklet document transport mechanism.

In one embodiment:
a first communication module, is configured to enable a communication between the inkjet printing module and a remote computer comprising a display screen, and
a second communication module, is configured to enable a communication between the laser marking module and the remote computer comprising a display screen, the communication possibly be wired or wireless communication.

In one embodiment, the casing comprises a flap that enables manual access to the inkjet printing module, the opening of the flap shutting off the power to the laser marking head.

The flap optionally further comprises a manual hatch, the size of which being bigger than the size of a security booklet document, to enable manual insertion of a security booklet document in the inkjet printing module through that flap.

In one embodiment:
the inkjet printing module comprises the security booklet document transport mechanism; and
the security booklet document transport mechanism comprises a set of at least one clamp to clamp the security booklet document open.

It may be provided with a detection sensor to detect the entrance of a security booklet document into the document transport mechanism.

In one embodiment: the document transport mechanism is configured to transport a security booklet document to the printing positions and the marking position with its spine parallel to the X-axis linear direction.

It may be provided with a flattening mechanism, to flatten the security booklet document open onto the document transport mechanism.

Preferably, the flattening mechanism is adjustable in size.

Preferably, the shortest distance between the printing head and the laser marking head is inferior to the width (W) of the security booklet document.

Preferably, the shortest distance between the vertical axis of the printing head and the vertical axis of the laser marking head is inferior or equal to 7 cm.

Preferably, the inkjet printing module is interchangeable with another inkjet printing module, and the laser marking module is interchangeable with another laser marking module.

The personalization device may be provided with:
a third communication module, configured to enable a communication between the camera and a remote computer comprising a display screen.

At least two of the first communication module, the second communication module and the third communication module may, possibly, be the same.

Preferably, the camera is configured to detect the position of the security booklet document, and to drive at least one of the inkjet printing module and the laser marking module according to a comparison of the position with a reference position.

Preferably, the distance between the vertical optical axis of the camera and the vertical axis of the laser beam of the laser marking head is inferior or equal to 6 cm. If the optical axis of the camera is oblique, then the "vertical optical axis" of the camera is considered to be a vertical axis passing through the camera.

Preferably, the optical axis of the camera is oblique; the angle between the oblique optical axis of the camera and the vertical optical axis of the laser beam of the laser marking head is inferior or equal to 10°.

The personalization device, according to embodiments of the present disclosure, allows several types of booklet personalization, notably:
Paper page 2 booklets,
Paper page 2 and paper page 3 booklets,
Polycarbonate page 2 booklets,
Polycarbonate page 2 and paper page 3 booklets,
With or without RFID chip.

Thanks to it modularity the personalization device, according to embodiments of the present disclosure, allows transitioning from paper passport to polycarbonate passport with a smooth investment.

The entire personalization of a passport is performed in one single pass, avoiding booklet manipulation and risks of errors during personalization. This guarantees perfect data matching, a secure process in one single pass and a perfect printed/marked data positioning on the booklet.

The personalization device is a front operated system with manual booklet insertion and retrieval thanks to a very precise moving tray of a transport mechanism, aimed at handling the booklet within the device modules to ensure high-precision movement for high-quality personalization.

Thanks to its casing, the personalization device looks like a compact cube. Because of its modularity, each module can be transported and handled by one man only.

Other features and advantages of embodiments of the present disclosure will appear in the detailed description that is given as a mere illustrative and non-limitative example.

DETAILED DESCRIPTION

For the sake of conciseness, the automatic desktop personalization device according to embodiments of the present disclosure will be referred to as a "personalization device."

Similarly, security booklet documents will be referred to as "passports."

The personalization device will be described as if based on a horizontal support, e.g., a table or a desk top.

The passport personalization device 100, according to embodiments of the present disclosure, is configured to be able to operate within the same device paper passports and hybrid passports, which comprise both paper and polycarbonate pages.

It offers a wide range of personalization options, all complying, e.g., with ICAO 9303 standards. As further described, the personalization device is modular, securing long-term personalization solution investment for secure passport issuance offices and centers.

It can be adapted to all types and sizes of passports.

The personalization device comprises a longitudinal axis, here called Y axis, along which passports are moved as described later.

Figure 1:
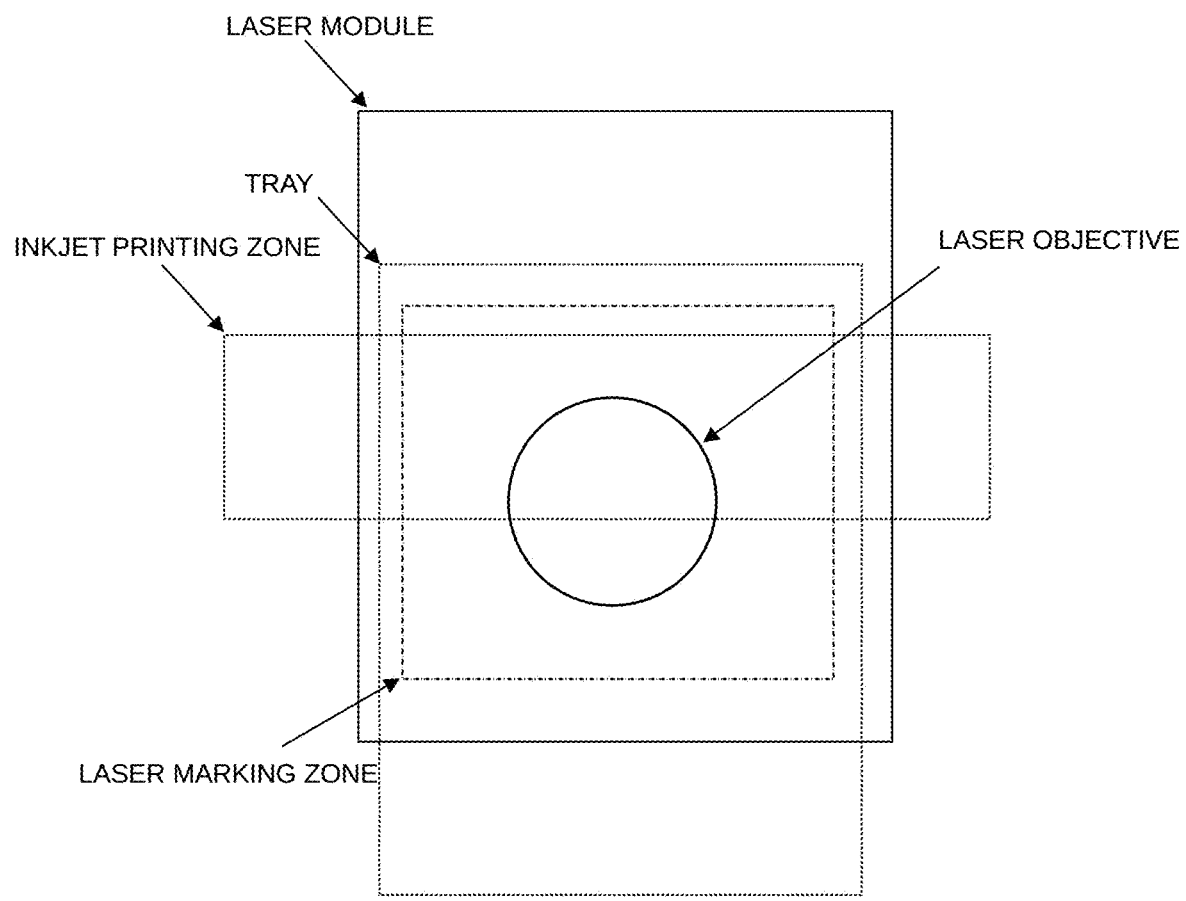
FIG. 1 illustrates, viewed from above, the overlapping of the printing zone and the laser marking zone in a personalization device according to embodiments of the present disclosure.
Figure 2:
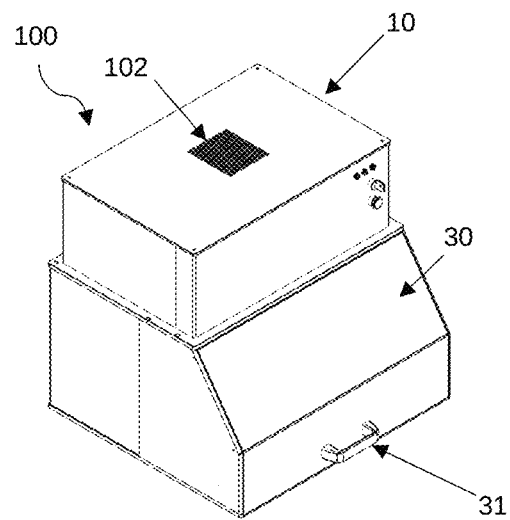
FIG. 2 illustrates a view of one embodiment of a personalization device according to embodiments of the present disclosure.
Figure 3:
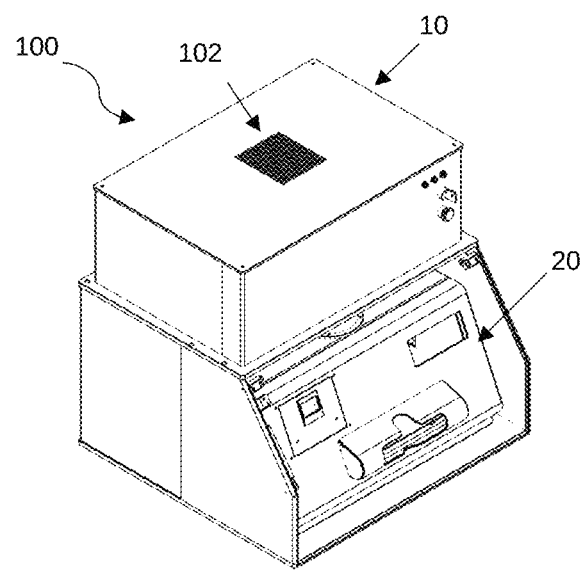
FIG. 3 illustrates the embodiment of FIG. 2 wherein the flap has been removed.
Figure 4:
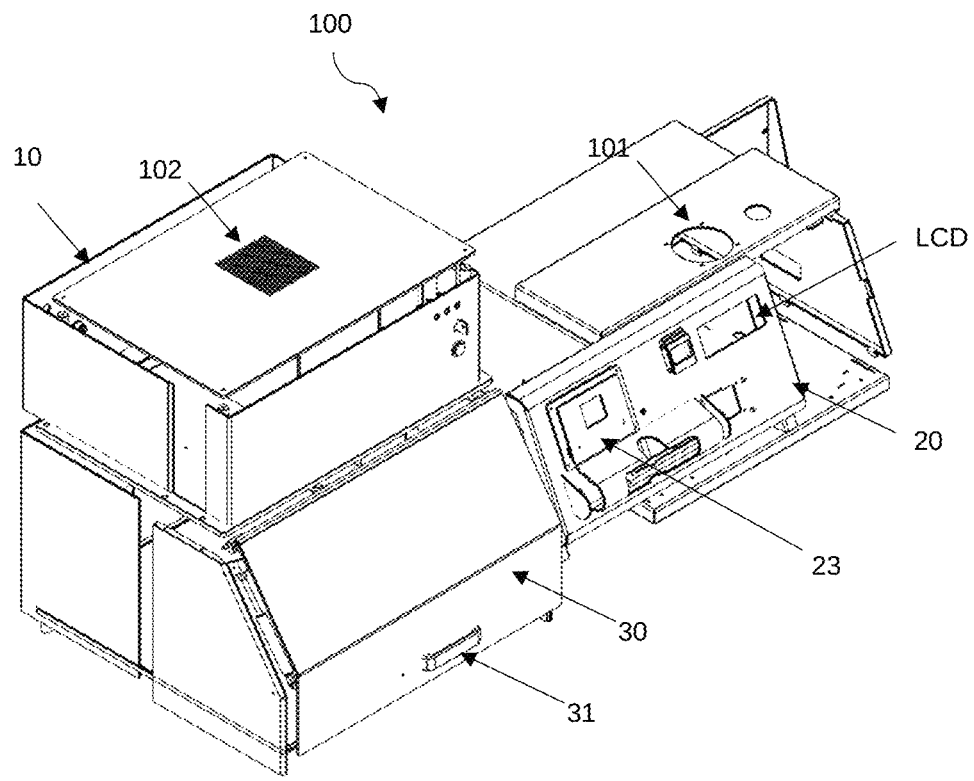
FIG. 4 illustrates the embodiment of FIG. 2 in a partially exploded view.

A partially exploded view of a personalization device is illustrated on FIG. 1, illustrating the entrance 21 and exit of the personalization device viewed from above.

The personalization device comprises a casing, which acts as a chassis at least for an inkjet printing module, which is further described.

The casing comprises at least one air vent 102, to vent the laser marking module 10 described here after. The casing also advantageously comprises a fan (not illustrated).

Preferably, the casing further comprises a set of legs having an adjustable height, to compensate for any lack of horizontality.

According to the present domain, passports must be printed or marked on one or two pages only. Both pages must be consecutive and on a same plane, meaning a leaf shall not be turned to print or mark from one page to the other. As of today, according to current ICAO standards such pages are page 2 and page 3 of a passport.

A passport comprises a linear spine in its centre.

Laser Marking Module

The personalization device comprises a laser module, which is a laser marking module 10 comprising a laser marking head 105.

Figure 6:
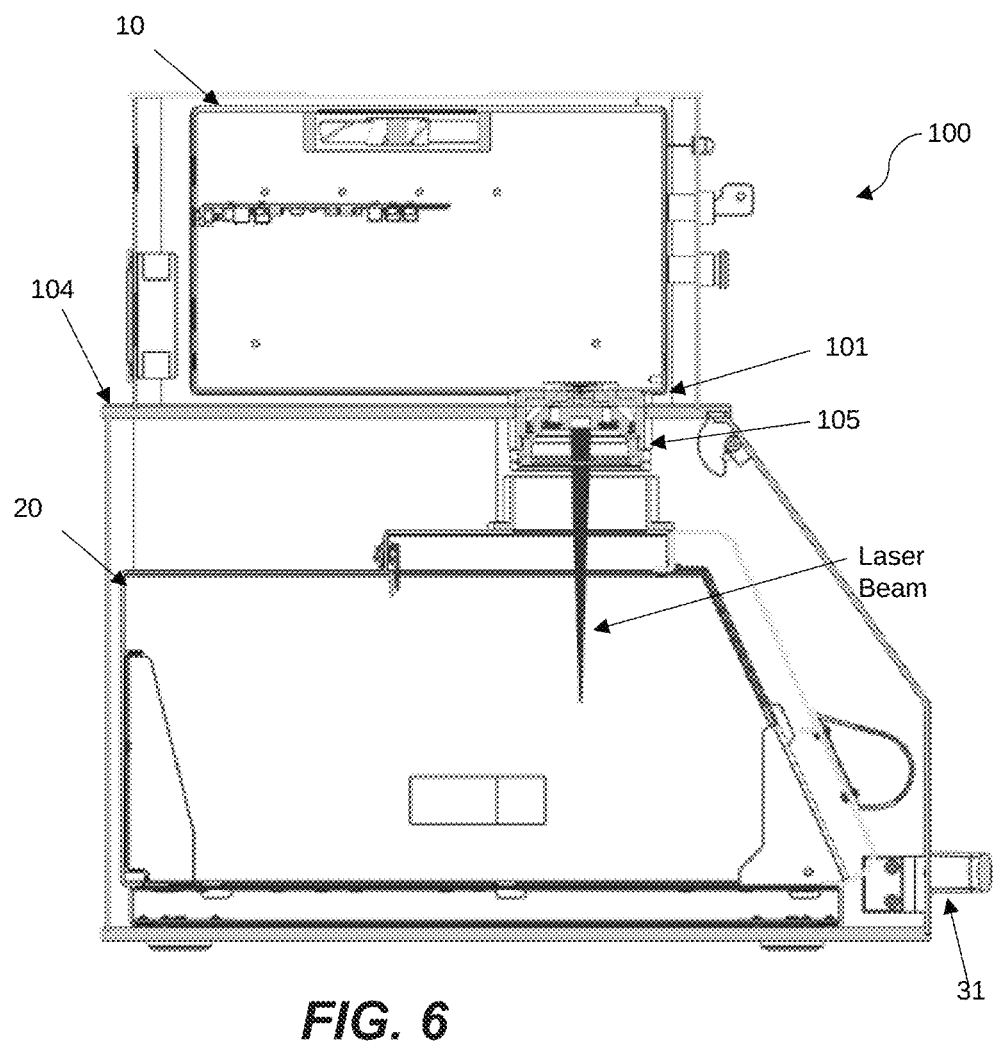
FIG. 6 illustrates the embodiment of FIG. 2 in a cross section.

The laser marking module 10 is located above, piled up with, the inkjet printing module 20, which is further described (see FIG. 6).

The laser marking head is configured to mark predetermined areas of a polycarbonate page (and/or certain types of paper) of a passport within a marking zone, where by "marking" it is understood any of the following processes:

annealing, marking, engraving, surface etching, foaming, color change/blackening/bleaching, carbonization, ablation.

Typically, the size of the marking zone is inferior or equal to the size of the page of a passport, especially a polycarbonate page.

Predetermined marking areas correspond typically to predetermined identification zones of the passport holder such as, for instance, the MRZ, his or her portrait, his or her name, date of birth, etc.

The laser head is stationary. It is adjacent to the printing bridge of the inkjet printing module, which is described here after, such that the marking zone and the printing zone are at least partly combined.

Figure 5:
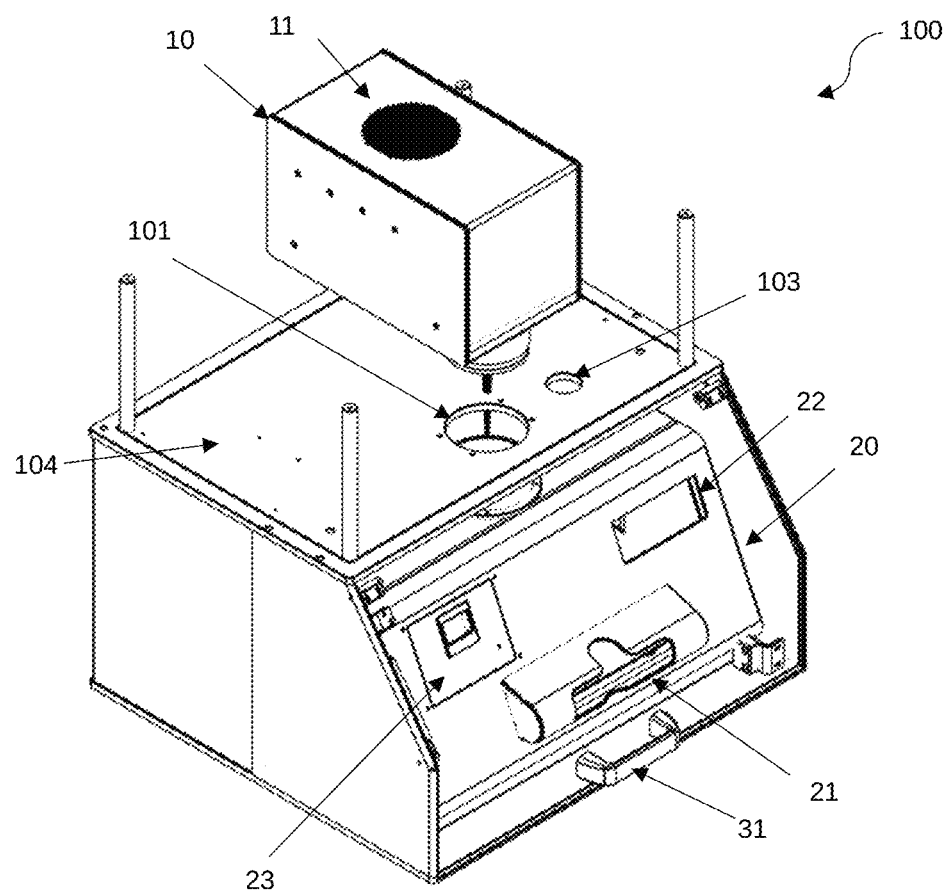
FIG. 5 illustrates the embodiment of FIG. 2 in a partially exploded view, with a detailed view of position of the laser marking module with regard to the inkjet printing module.

Located above the tray in a fixed position, the laser beam from the laser head of the laser marking module can go through an opening 101 (FIG. 5, FIG. 6) made in an horizontal rigid plate 104 of the casing between the laser marking module and the inkjet printing module. Accordingly, the laser marking zone is located within the inkjet printing module and at least partly overlaps, is coincident with, the inkjet printing zone. The horizontal rigid plate 104 of the casing acts as a support for the laser marking module and also prevents any ink projection from the inkjet printing head on the laser head or its optical elements.

The laser head is configured to perform all types of marking while the tray is positioned under the laser marking module such as:
  High definition gray scale picture(s) including ghost image,
  Thin high definition text including OCR-B MRZ characters used for captions and personalization data,
  Barcodes,
  Tactile personalization elements,
  Thin to bold texts according to specification, and
  CLI-MLI elements.

One of the at least three following different laser sources can be implemented such as:
  10W DPSS (Diode-pumped solid-state) laser source,
  3W DPSS laser source, and
  20W DPSS laser source.

Other laser sources technologies can be implemented such as e.g., fibre laser sources.

Such flexibility provided scalable performance while ensuring the exact same result in terms of marking quality and characteristics.

According to embodiments of the disclosure, the laser marking module is a stand-alone module fixed within the casing, e.g., with screws, allowing the laser marking module to be secured within the casing but being nonetheless removable in times of need. Accordingly, the laser marking module is interchangeable with another laser marking module, for example, if there is a need for a more powerful laser.

The laser marking module comprises a communication module, configured to enable a communication between the laser marking module and the remote computer comprising a display screen. Preferably, the communication module comprises a USB communication port, supporting PC/SC protocol and ICAO 9303 compliance.

Neither the laser marking module nor the laser marking head can be moved in translation along the Y-axis or the X-axis.

The laser marking module 10 comprises an air vent 11, the position of which corresponding to the position of the air vent 102 of the casing.

Inkjet Printing Module

The personalization device comprises an inkjet printing module 20, which comprises a moveable printing head mounted on a fixed printing bridge. The printing head is movable alongside an X-axis linear direction, which is perpendicular to the Y-axis linear direction of the transport of the passport.

The printing head can adopt at least the 3 following positions:
  Printing positions, where the printing head is configured to print within a printing zone,
  A printhead purge position, where the printing head can be purged, and
  A parking position, where the printing head can be parked, and where the inkjet cartridges are located.

The printing operation is implemented with a plurality of printing positions as the tray moves along the Y-axis linear direction during the printing operation.

Preferably, the printing head is connected to color and black inkjet cartridges. It is configured to print on any or both of page 2 and page 3 of a passport. The colors can be within the visible spectrum, the UV spectrum, the IR spectrum, or any combination thereof. Inkjet cartridges are accessible through an access 23.

The printing head is configured to print within predetermined printing areas of any paper page, and optionally in addition on a polycarbonate page, of a passport within a printing zone. Typically, the size of the printing zone is inferior or equal to the size of the paper page of a passport.

Predetermined printing areas correspond typically to predetermined identification zones of the passport holder such as, for instance, the MRZ, his or her portrait, his or her name, date of birth, etc.

Preferably, the shortest distance between the printing head and the laser marking head is inferior to the width of the passport cover page. Even more preferably, such distance is inferior or equal to half the width of the passport, and in one embodiment is inferior or equal 3 cm. The shorter that distance is, the more compact the personalization device can be.

The inkjet printing module comprises a substantially flat horizontal surface on which a transport mechanism, the printing bridge and a flattening mechanism, are mounted.

In one embodiment, the inkjet printing module is based on an existing printer, such as the Hiprint™ P4000, produced by the applicant, which comprises a flattening mechanism; and from which the top casing is removed. For those starting with 'paper only' booklet and upgrading to 'paper and polycarbonate' at a later stage, it is possible that such Hiprint™ P4000 printer can be reused within the proposed personalization device, allows transitioning from paper passport to polycarbonate passport with a smooth investment. Such printer offers high quality printing (up to 4800 dpi) for paper booklets personalization. It does include a 4-color inkjet printing head, which can easily be hot swapped by an operator.

The flattening mechanism is configured to flatten the passport open onto the document transport mechanism. Preferably, the flattening mechanism is adjustable in size. Accordingly, it is possible to adjust various sizes of passports.

Advantageously, the transport mechanism of the personalization device is the transport mechanism of the inkjet printing module, which can be an existing inkjet printer as exposed above. Accordingly, the inkjet printing module comprises the passport transport mechanism.

The transport mechanism is configured to automatically transport a passport along a Y-axis linear direction, from an entrance to an exit of the personalization device, wherein the entrance and the exit are the same. The personalization device is then a front-operated manual feeder, for both passport insertion and retrieval.

The transport mechanism comprises a tray on which the passport is placed for marking/printing. The tray is moved along guide bars, which is a high precision mechanism known in itself allowing highly precise positioning of the tray. Preferably, the tray is provided with a secure handle, ensuring proper passport positioning.

The transport mechanism comprises a set of at least one clamp to clamp the passport open for printing and marking.

The transport mechanism is configured to transport the passport to printing positions and to a marking position, which is different from the printing positions.

The document transport mechanism is configured to transport a passport to the printing positions and the marking position with the passport having its spine parallel to the X-axis linear direction.

The inkjet printing module is accessible through a flap 30 within the casing, preferably equipped with a handle, as illustrated FIG. 2 to FIG. 5. The opening of the flap, e.g., via a handle 31, enables access to the inkjet printing module, e.g., for its repair or replacement. Accordingly, the personalization device is modular. The size of the flap is bigger than the size of the inkjet printing module.

Preferably, for safety reasons, the opening of the flap shuts off the power to the laser marking head, for instance, with a sensor acting as a circuit breaker.

In one embodiment, the flap further comprises a manual hatch (not illustrated), the size of which being bigger than the size of a passport, to enable manual insertion of a passport in the inkjet printing module through that flap. Preferably, the opening of the hatch shuts off the power to the laser marking head. Opening the hatch allows the operator to insert a passport without having to open the flap. In such a case, the flap can be open just for maintenance reasons, e.g., change of the inkjet cartridges. The hatch allows an operator to insert and retrieve a passport with just a movement of his hands, which is better in terms of ergonomics than manipulating the flap, which requires an additional movement of the shoulder.

According to embodiments of the disclosure, the inkjet printing module is a stand-alone module fixed within the casing, e.g., with screws, allowing the inkjet printing module to be secured within the casing but being nonetheless removable in times of need. Accordingly, the inkjet printing module is interchangeable with another inkjet printing module.

The inkjet printing module comprises a communication module, configured to enable a communication between the inkjet printing module and a remote computer comprising a display screen. Preferably, the communication module comprises a USB communication port, supporting PC/SC protocol and ICAO 9303 compliance.

Preferably, the inkjet printing module 20 comprises a display screen 22, e.g., a LCD screen, which is driven by the mother card of the inkjet printing module 20, and which allows to display maintenance information, like e.g., the level of ink left.

Vision & Detection Systems

The personalization device comprises a vision system, comprising a camera, aimed at ensuring personal data positioning (offset registration).

In addition, it can as well ensure element detection (i.e., OCR) and automated quality control at the end of the personalization process.

The vision system may be used for several purpose:
Passport proper introduction and orientation verification (specific element detection),
Passport ID retrieval,
Printing/marking image repositioning (offset positioning) to ensure a perfect printing zone position,
Page 2 and/or page 3 graphical area snapshot for post-personalization quality control, data consistency check, and personalization characteristics verification,
Page 2 and/or page 3 snapshot to store passport final image into a database.

The camera is particularly configured to detect the position of the passport once positioned on the transport mechanism. It is also configured to drive at least one of the inkjet printing module and the laser marking module according to a comparison of the position with a reference position.

The camera can detect the position of the passport, i.e., which of page 2 and page 3 enters first. If the position of the passport is improper, a warning message can be triggered, the transport mechanism can be automatically reversed to eject the passport, or any other suitable operation.

Preferably, the personalization device further comprises a detection system, e.g., a presence sensor, typically an optical sensor such as a photocell, or any other detection mechanism to detect the entrance of a passport into the personalization device or into the transport mechanism.

Preferably, the camera is close to the laser marking head, where "close" means at a distance inferior to a predetermined value. For instance, the distance between the camera for the offset registration and the laser marking head is inferior or equal to 2 cm. It is worth noting that several cameras may be provided, e.g., one for the offset registration and one for the passport position detection.

Preferably, the angle between the optical axis of the camera for the offset registration and the laser beam of the laser marking head is inferior or equal to a predetermined value, here inferior or equal to 10°.

The vision system comprises a communication module, configured to enable a communication between the camera and a remote computer comprising a display screen. Preferably, the communication module comprises a USB communication port, supporting PC/SC protocol and ICAO 9303 compliance.

In one embodiment, a camera of the vision system is located in the casing above the inkjet printing module 20, adjacent to the laser marking module 10. The optical axis of the camera goes through an opening 103 made in the horizontal rigid plate 104, adjacent to the opening 101.

Chip Encoding Module

The personalization device comprises a chip encoding module, configured to read and to encode a chip comprised within the passport.

Typically, the chip is a RFID chip, thus the chip encoding module is an RFID encoding module comprising a RFID antenna. More precisely, the RFID module is based on a set including reader electronics and a separate antenna complying with ICAO 9303 requirements.

In one embodiment, the chip encoding module is comprised in the inkjet printing module.

In one embodiment, the RFID antenna is located under the tray of the transport mechanism. Thanks to the antenna position, once the booklet is inserted in the personalization device, it is possible to establish a communication with the chip, and therefore to start encoding whatever the other operations in progress are. Typically, it is possible to encode while printing and/or marking, which allows significant time saving during the entire personalization process.

Advantageously, the chip encoding module is integral with the passport transport mechanism. Accordingly, the chip of the passport can be encoded while the passport is being transported from a position to another, both reducing the time of personalization and compacting the desktop personalization device. This allows parallel encoding while printing, speeding-up the whole personalization process for more production throughput and efficiency.

Further because of its location, the chip encoding module allows the personalization device to be more compact than prior art solutions where the chip encoding module is located in between the laser marking module and the inkjet printing module.

The chip encoding module comprises a communication module, configured to enable a communication between the chip encoding module and a remote computer comprising a display screen. Preferably, the communication module comprises a USB communication port, supporting PC/SC protocol and ICAO 9303 compliance.

Preferably, the communication module of the chip encoding module is the same than the communication module of the inkjet printing module.

One only communication module can be provided for the vision system, the laser marking module, the inkjet printing module and the chip encoding module.

In Operation

Passports are fed preferably manually to the entrance of the transport mechanism along the Y axis in a feeding direction.

The nature (paper or polycarbonate) of page 2 and the nature (paper or polycarbonate) of page 3 of the passport to be personalized is known; the nature and position of each caption and personalization fields is known, the presence or the absence of an RFID chip is also known, and the personalization device is set accordingly.

In this case passports are fully opened (180 degrees) and pushed into the printer, page 3 first and page 2 at the rear. A sensor inside the printer detects the presence of the passport and automatically activates transporting belts of the transport mechanism.

Once inserted, the booklet is securely clamped within the tray, ensuring proper positioning and a flat surface. Thus, passports enter into the transport mechanism in a substantially flat position, opened on the page(s) that is(are) to be printed and/or marked. Advantageously, the spine of the passport is parallel to the X axis, allowing the personalization device to be more compact.

Tray's role is to securely hold the booklet in an open flat position, and to move it from one personalization position to another one, for instance:
  Position under the camera for blank booklet verification,
  Position under the laser head to personalize page 2, and
  Position at the start position to perform page 3 inkjet printing.

Once the passport is inserted, the digital camera is activated and used to retrieve passport ID (MRTD documents). In case of e-passports, RFID chip may be used for this operation. To do so, the personalization software will instruct the tray to position under the camera spot. The camera is able to take a full page (page 2 or page 3) snapshot.

In one embodiment, the printing zone is close to the entrance of the personalization device, where "close" means at a distance inferior to a predetermined value, such that the printing operation can start before the passport is entirely entered within the inkjet printing module, allowing the personalization device to be even more compact.

The personalization device operated from the front and the operator will always insert and retrieve the booklet, but no handling additional operation is required from the operator.

The personalization is supervised from a personalization software supervision on an external PC, which communicates with the personalization device through the communication module(s) of the personalization device.

Since the RFID antenna is located under the tray, and therefore ensures a permanent communication between the rear cover chip and the RFID reader, the machine allows encoding while marking and/or printing.

This solution allows a quicker personalization thanks to parallel graphical and chip processes. All of this is managed by the personalization software in charge of controlling the machines, its modules and the operations.

The tray is then moving within a 'Y' axis, from the front to the rear. The printing process is a combined X-axis movements of the printing head along the printing bridge, and Y-axis movements of the booklet tray along the guide bars of the transport mechanism.

Advantageously, the camera, the printing head and the laser head are located on top of the tray and can be activated by the personalization software.

The applicant has realized some tests giving the following performances for various possible configurations.

As a reference, up to 180-200 passports per hour can be issued while using Hiprint™ P4000 under printing only conditions, corresponding to around an average of under 7 sec. for printing one page.

Tests with a personalization device using a Hiprint™ P4000 and various powers for the laser source have been implemented, using 3W, 10W and 20W laser power source. Operations of laser marking (page 2) only have been made, as well as laser marking (page 2)+inkjet printing (page 3)+RFID (RFID encoding parallel with the laser marking).

Results were within the range of as low as approx. 49 sec per booklet to approx. 102 sec per booklet; and from 35 booklets per hour up to 73 booklets per hour.

The invention claimed is:

1. An automatic desktop personalization device, for personalization of security booklet documents comprising a spine, the personalization device comprising:
  a casing;
  a camera;
  an inkjet printing module, comprising a moveable printing head mounted on a fixed printing bridge, and configured to print within a printing zone;
  a laser marking module, comprising a laser marking head, configured to mark within a marking zone;
  a chip encoding module; and
  a security booklet document transport mechanism, configured to automatically transport a security booklet document along a Y-axis linear direction, from an entrance to an exit of the automatic desktop personalization device, through printing positions and a marking position, which is different from the printing positions, wherein the entrance and the exit are the same,
  wherein the printing head is movable alongside an X-axis linear direction, which is perpendicular to the Y-axis linear direction, and
wherein:
  the inkjet printing module comprises the security booklet document transport mechanism,
  the laser marking head is adjacent to the printing bridge, such that the marking zone and the printing zone are at least partly combined, and the laser marking module is located above, piled up with, the inkjet printing module, such that the laser marking zone is located within the inkjet printing module and at least partly overlaps, is coincident with, the inkjet printing zone.

2. The automatic desktop personalization device of claim 1, wherein the chip encoding module is integral with the security booklet document transport mechanism.

3. The automatic desktop personalization device of claim 1, further comprising:
   a first communication module, configured to enable a communication between the inkjet printing module and a remote computer comprising a display screen; and,
   a second communication module, configured to enable a communication between the laser marking module and the remote computer comprising the display screen, the communication being a wired or wireless communication.

4. The automatic-desktop personalization device of claim 3, further comprising:
   a third communication module, configured to enable a communication between the camera and the remote computer comprising the display screen.

5. The automatic desktop personalization device of claim 4, wherein at least two of the first communication module, the second communication module, and the third communication module are a same communication module.

6. The automatic-desktop personalization device of claim 1, wherein the casing comprises a flap, wherein the flap enables manual access to the inkjet printing module, the opening of the flap shutting off the power to the laser marking head.

7. The automatic desktop personalization device of claim 6, wherein the flap further comprises a manual hatch, the size of the manual hatch being bigger than the size of the security booklet document, to enable manual insertion of the security booklet document in the inkjet printing module through the flap.

8. The automatic-desktop personalization device of claim 1, wherein:
   the inkjet printing module comprises the security booklet document transport mechanism; and
   the security booklet document transport mechanism comprises a set of at least one clamp to clamp the security booklet document open.

9. The automatic desktop personalization device of claim 8, further comprising a flattening mechanism to flatten the security booklet document open onto the document transport system.

10. The automatic desktop personalization device of claim 9, wherein the flattening mechanism is adjustable in size.

11. The automatic desktop personalization device of claim 1, further comprising a detection sensor to detect the entrance of the security booklet document into the document transport mechanism.

12. The automatic-desktop personalization device of claim 1, wherein the document transport mechanism is configured to transport the security booklet document to the printing positions and the marking position with a spine of the security booklet document parallel to the X-axis linear direction.

13. The automatic desktop personalization device of claim 1, wherein a shortest distance between the printing head and the laser marking head is inferior to a width of the security booklet document.

14. The automatic-desktop personalization device of claim 13, wherein a shortest distance between a vertical axis of the printing head and a vertical axis of the laser marking head is inferior or equal to 7 cm.

15. The automatic-desktop personalization device of claim 1, wherein the inkjet printing module is interchangeable with another inkjet printing module, and wherein the laser marking module is interchangeable with another laser marking module.

16. The automatic desktop personalization device of claim 1, wherein the camera is configured to detect a position of the security booklet document, and to drive at least one of the inkjet printing module and the laser marking module according to a comparison of the position with a reference position.

17. The automatic desktop personalization device of claim 1, wherein a distance between a vertical optical axis of the camera and a vertical axis of a laser beam of the laser marking head is inferior or equal to 6 cm.

18. The automatic desktop personalization device of claim 1, wherein an optical axis of the camera is oblique, and an angle between the oblique optical axis of the camera and a vertical optical axis of a laser beam of the laser marking head is inferior or equal to 10°.

\* \* \* \* \*